US012711080B2

(12) United States Patent
Brewer

(10) Patent No.: US 12,711,080 B2
(45) **Date of Patent: *Aug. 18, 2026**

(54) REDUCING LATENCY FOR MEMORY OPERATIONS IN A MEMORY CONTROLLER

(71) Applicant: Micron Technology, Inc., Boise, ID (US)

(72) Inventor: Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 606 days.

This patent is subject to a terminal disclaimer.

(21) Appl. No.: 17/952,971

(22) Filed: Sep. 26, 2022

(65) Prior Publication Data

US 2023/0019931 A1 Jan. 19, 2023

Related U.S. Application Data

(63) Continuation of application No. 17/074,765, filed on Oct. 20, 2020, now Pat. No. 11,455,262.

(51) Int. Cl.
*G06F 13/16* (2006.01)
*G06F 13/28* (2006.01)
*G06F 15/78* (2006.01)

(52) U.S. Cl.
CPC ........ *G06F 13/1689* (2013.01); *G06F 13/161* (2013.01); *G06F 13/1642* (2013.01); *G06F 13/287* (2013.01); *G06F 15/7825* (2013.01)

(58) Field of Classification Search
CPC ........ G06F 12/00; G06F 13/00; G06F 13/161; G06F 13/1689; G06F 13/287; G06F 13/1642; G06F 15/7825
See application file for complete search history.

(56) References Cited

U.S. PATENT DOCUMENTS 5,860,117 A 1/1999 Cherabuddi
6,151,664 A 11/2000 Borkenhagen et al.
(Continued)

FOREIGN PATENT DOCUMENTS

CN 108268386 7/2018
CN 111656334 A 9/2020
(Continued)

OTHER PUBLICATIONS

"Chinese Application Serial No. 202111214507.3, Office Action mailed Apr. 18, 2025", W/English Translation, 29 pgs.
(Continued)

*Primary Examiner* — Sanjiv Shah
(74) *Attorney, Agent, or Firm* — Schwegman Lundberg & Woessner, P.A.

(57) ABSTRACT

Disclosed in some examples are methods, systems, memory controllers, devices, and machine-readable mediums which minimize this stall time by returning a memory write acknowledgement once a write command has been selected by the memory controller input multiplexor rather than when the memory write command has been performed. Because the memory controller enforces an ordering to memory once the packet has been selected at an input multiplexor, ordering of prior and subsequent requests to the same address location are preserved and providing the response early allows the processor to continue its operations earlier without any harmful effects.

20 Claims, 7 Drawing Sheets

(56) References Cited

U.S. PATENT DOCUMENTS

| | | | | |
|---|---|---|---|---|
| 7,047,328 | B1 * | 5/2006 | Rosner | G06F 13/28 710/305 |
| 7,102,842 | B1 * | 9/2006 | Howard | G11B 5/5521 360/78.12 |
| 8,166,237 | B1 | 4/2012 | Atsatt et al. | |
| 2003/0110350 | A1 | 6/2003 | Mcgee et al. | |
| 2018/0024764 | A1 | 1/2018 | Miller | |
| 2020/0379926 | A1 | 12/2020 | Gopalakrishnan | |
| 2021/0286742 | A1 * | 9/2021 | Schmidt | G06F 3/126 |
| 2022/0121584 | A1 | 4/2022 | Brewer | |

FOREIGN PATENT DOCUMENTS

| | | | |
|---|---|---|---|
| CN | 111656335 | A | 9/2020 |
| CN | 111684432 | A | 9/2020 |

OTHER PUBLICATIONS

"Chinese Application Serial No. 202111214507.3, Response filed Aug. 18, 2025 to Office Action mailed Apr. 18, 2025", with English claims, 21 pages.

* cited by examiner

REDUCING LATENCY FOR MEMORY OPERATIONS IN A MEMORY CONTROLLER

PRIORITY APPLICATION

This application is a continuation of U.S. application Ser. No. 17/074,765, filed Oct. 20, 2020, which is incorporated herein by reference in its entirety.

STATEMENT REGARDING GOVERNMENT SUPPORT

This invention was made with U.S. Government support under Agreement No. HR00111890003, awarded by DARPA. The U.S. Government has certain rights in the invention.

FIELD OF THE INVENTION

In some examples, this disclosure relates to chiplet technologies. In some examples, this disclosure relates to memory controllers chiplets. In some examples, this disclosure relates to reducing latency for memory operations of a chiplet memory controller.

BACKGROUND

Chiplets are an emerging technique for integrating various processing functionalities. Generally, a chiplet system is made up of discreet modules (each a "chiplet") that are integrated on an interposer, and in many examples interconnected as desired through one or more established networks, to provide a system with the desired functionality. The interposer and included chiplets may be packaged together to facilitate interconnection with other components of a larger system. Each chiplet may include one or more individual integrated circuits, or "chips" (ICs), potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems may include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics may be assembled in a modular manner to provide an assembly providing desired functionalities. Chiplet systems can also facilitate adaptation to suit needs of different larger systems into which the chiplet system will be incorporated. In an example, IC's or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

FIG. 1, described below, offers an example of a chiplet system and the components operating therein. As explained below, such chiplet systems may include a memory controller chiplet that may control one or more off-die memory devices, as may be located, in some examples, on other chiplets. In a chiplet system, minimizing processor stall time, such as when the processor is waiting for a response from the memory controller, is critical to maximize performance. For example, a processor that requests a memory write does not perform any other operations for a particular process that requested the memory write until the memory write is acknowledged. Once the acknowledgement is received from the memory controller, the process may continue with subsequent instructions.

Disclosed in some examples are methods, systems, memory controllers, devices, and machine-readable mediums which minimize this stall time by returning a memory write acknowledgement once a write command has been selected for processing by the memory controller input multiplexor rather than when the memory write command has been performed. Because the memory controller enforces an ordering to memory once the packet has been selected at an input multiplexor, ordering of prior and subsequent requests are preserved and providing the response early allows the processor to continue its operations earlier without any harmful effects.

Figures 1A, 1B:
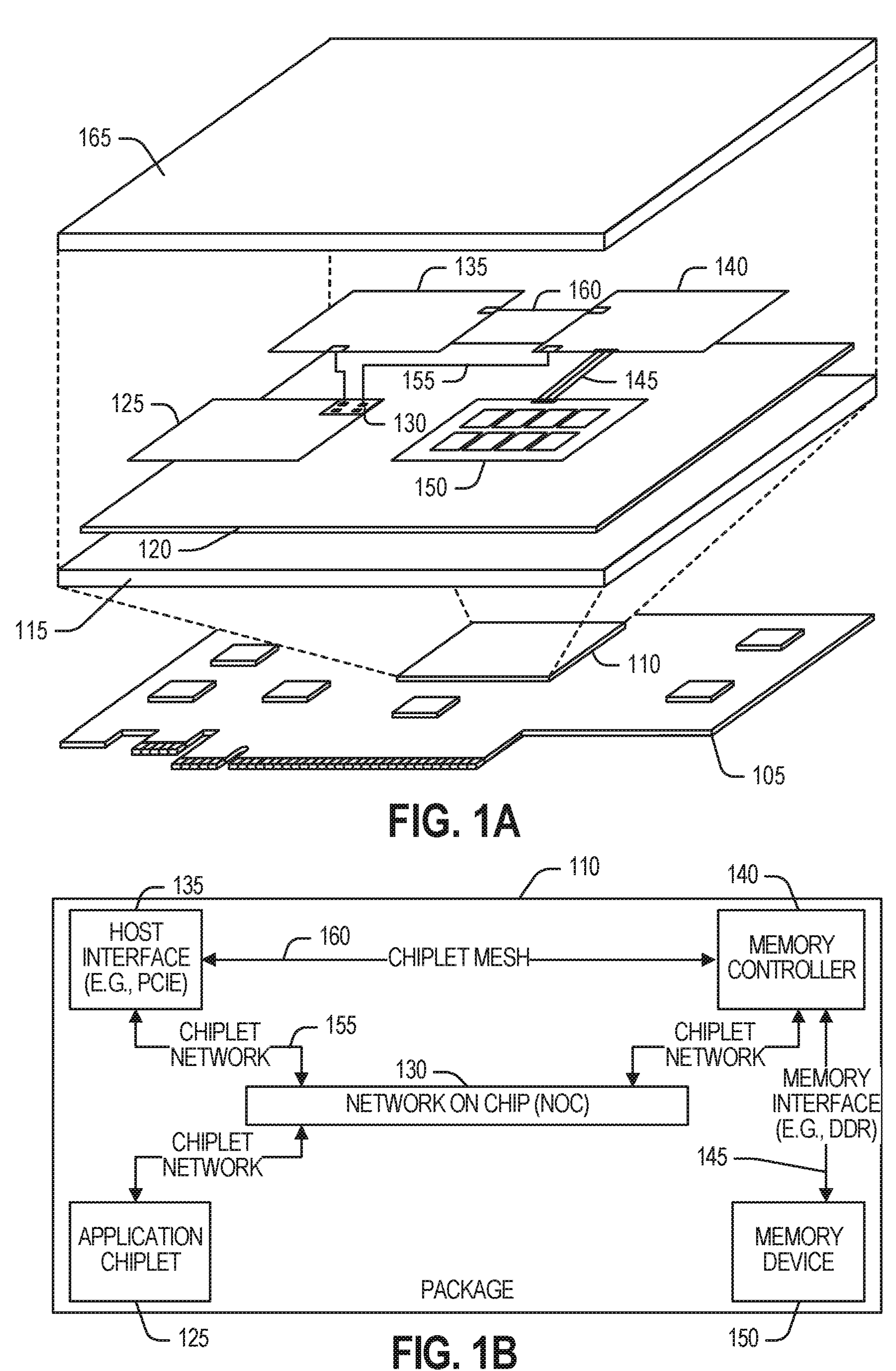
FIGS. 1A and 1B illustrate an example of a chiplet system, according to some examples of the present disclosure.

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems may include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 may be included on the application chiplet 125. In an example, NOC 130 may be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB primary or secondary depending on which chiplet provides the primary clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half RX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency may be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR 6), can also be used to interconnect chiplets. Connection of a chiplet system or individual chiplets to external devices (such as a larger system can be through a desired interface (for example, a PCIE interface). Such as external interface may be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operation execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh may be controlled by a host processor or of a memory controller at some times, and at other times controlled by the DRAM memory device, or by logic associated with one or more DRAM devices, such as an interface chip (in an example, a buffer).

Atomic transactions are one or more data manipulation operations that, for example, may be performed by the memory controller chiplet 140. In other chiplet systems, the atomic transactions may be performed by other chiplets. For example, an atomic transaction of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic transactions avoid transmitting the data across the chiplet mesh network 160, resulting in lower latency execution of such commands.

Atomic transactions can be classified as built-in atomics or programmable (e.g., custom) atomic transactions. Built-in atomic transactions are a finite set of operations that are immutably implemented in hardware. Programmable atomic transactions are small programs with one or more instructions (e.g., an instruction set) that may execute on a programmable atomic unit (PAU) (e.g., a custom atomic unit (CAU)) of the memory controller chiplet 140. FIG. 1 illustrates an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets may be provided. In an example, these memory device chiplets may each implement one or multiple storage technologies. In an example, a memory chiplet may include, multiple stacked memory die of different technologies, for example one or more SRAM devices stacked or otherwise in communication with one or more DRAM devices. Memory controller 140 may also serve to coordinate operations between multiple memory chiplets in chiplet system 110; for example, to utilize one or more memory chiplets in one or more levels of cache storage, and to use one or more additional memory chiplets as main memory. Chiplet system 110 may also include multiple memory controllers 140, as may be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
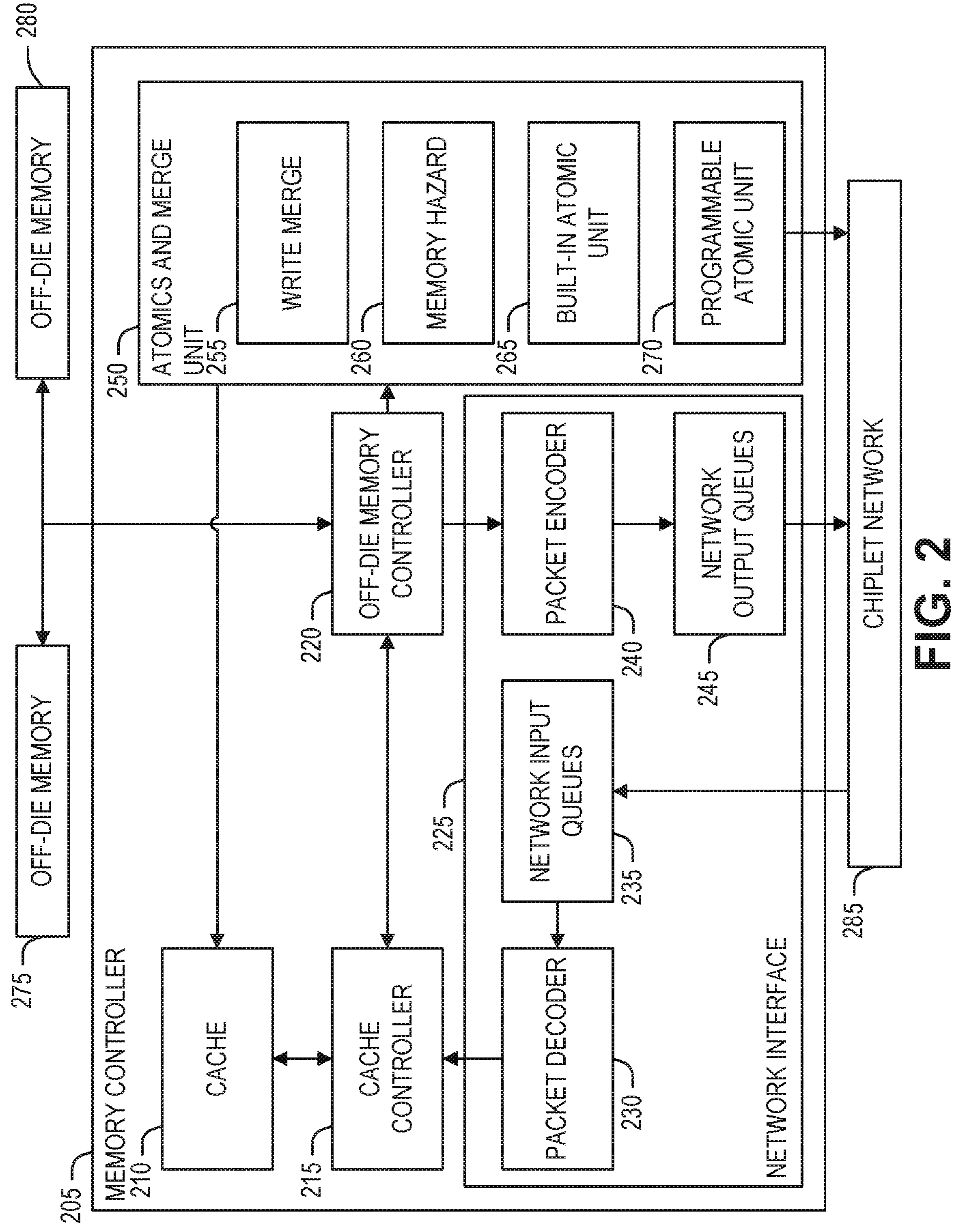
FIG. 2 illustrates components of an example of a memory controller chiplet, according to some examples of the present disclosure.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge unit 250. Members of this set can include, for example, a write merge unit 255, a memory hazard unit 260, built-in atomic unit 265 (for performing built in atomic transactions), or a programmable atomic unit (PAU) 270 (for performing programmable atomic transactions). The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples may be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 215 (e.g., a memory side cache controller).

In the example configuration, cache controller 215 is directly coupled to the cache 210, and may be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache may also be implemented in off-die memories 275 or 280; and in some such examples may be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet). The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic unit 265 receives the request and reads data, either from the write merge unit 255 or directly from the off-die memory controller 220. The atomic transaction is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic transactions such as fetch-and-increment or compare-and-swap. In an example, these transactions perform a simple read-modify-write operation to a single memory location of 32-bytes or less in size. Atomic memory transactions are initiated from a request packet transmitted over the chiplet network 285. The request packet has a physical address, atomic operator type, operand size, and optionally up to 32-bytes of data. The atomic transaction performs the read-modify-write to a cache memory line of the cache 210, filling the cache memory if necessary. The atomic transaction response can be a simple completion response, or a response with up to 32-bytes of data. Example atomic memory transactions include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compareand-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic transactions can also involve requests for a "standard" atomic standard on the requested data, such as comparatively simple, single cycle, integer atomics—such as fetch-and-increment or compare-and-swap—which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic transaction. Following the atomic transaction, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic transactions (also referred to as "custom atomic transactions" or "custom atomic operations"), comparable to the performance of built-in atomic transactions. Rather than executing multiple memory accesses, in response to an atomic transaction request designating a programmable atomic transaction and a memory address, circuitry in the memory controller chiplet 205 transfers the atomic transaction request to PAU 270 and sets a hazard bit stored in a memory hazard register corresponding to the memory address of the memory line used in the atomic operation, to ensure that no other operation (read, write, or atomic transaction) is performed on that memory line, which hazard bit is then cleared upon completion of the atomic transaction. Additional, direct data paths provided for the PAU 270 executing the programmable atomic transactions allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic transactions. When provided with the extended instruction set for executing programmable atomic transactions, the processor of PAU 270 can be embodied as one or more hybrid threading processors. In some example embodiments, the processor of PAU 270 provides barrel-style, round-robin instantaneous thread switching to maintain a high instruction-per-clock rate.

PAU 270 may include a local memory such as Static Random-Access Memory (SRAM), NAND, phase change memory, or the like. The local memory may include registers, instruction memory, and cache. The local memory may be accessible to the processor through a memory controller.

Programmable atomic transactions can be performed by the PAU 270 involving requests for programmable atomic transactions on the requested data. A user can prepare programming code in the form of one or more instructions to provide such programmable atomic transactions. For example, the programmable atomic transactions can be comparatively simple, multi-cycle operations such as floating-point addition, or comparatively complex, multi-instruction operations such as a Bloom filter insert. The programmable atomic transactions can be the same as or different than the predetermined atomic transactions, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic transaction. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic transactions is to provide multiple, generic, programmable atomic transaction request types that can be sent through the chiplet network 285 to the memory controller chiplet 205 from an originating source such as a processor or other system component. The cache controllers 215 or off-die memory controller 220 identify the request as a programmable atomic transaction and forward the request to the PAU 270. In a representative embodiment, the PAU 270: (1) is a programmable processing element capable of efficiently performing a user defined atomic transaction; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined transaction. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard unit 260. Accordingly, when the request and read data is received by the write merge unit 255, a reset or clear signal can be transmitted by the memory hazard unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
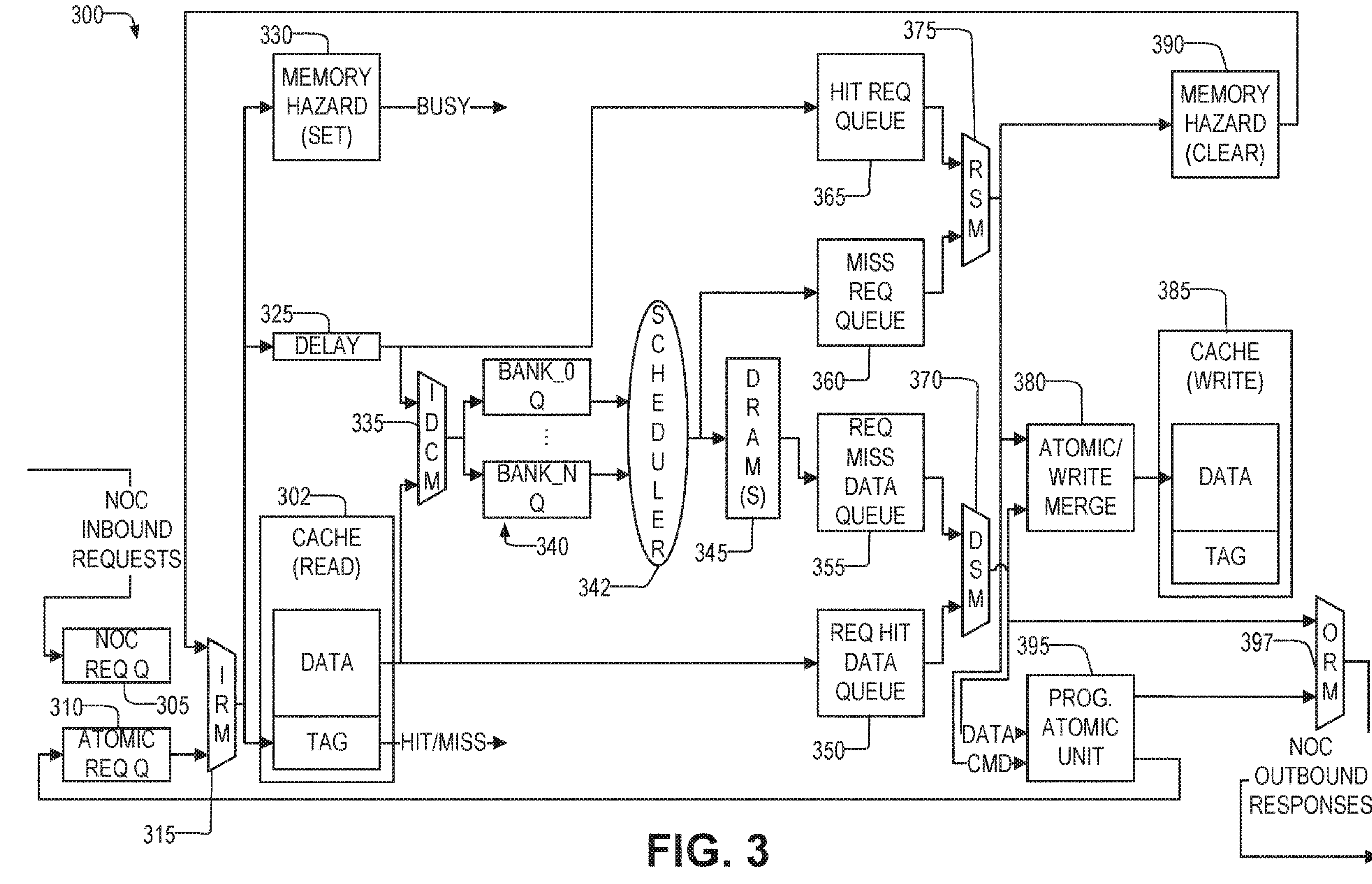
FIGS. 3-5 illustrate schematics of a memory controller according to some examples of the present disclosure.

FIG. 3 illustrates a functional schematic of a memory controller 300 in association with memory (345) according to some examples of the present disclosure. FIG. 3 is another example of a memory controller chiplet 205 and shows many of the same components as shown in FIG. 2. For example, the cache 320 and 385 are examples of cache 210; DRAM(s) 345 are examples of off-die memory 275-280; atomic/write merge 380 and the programmable atomic unit 395 may be an example of atomics and merge unit 250; other components of FIG. 3 may be examples of other components of FIG. 2 such as off-die memory controller 220 and cache controller 215. NOC Request Queue 305 receives requests from the network-on-chip and provides a small amount of queuing. Atomic request queue 310 receives requests from the programmable atomic unit and provides a small amount of queuing. Inbound Request Multiplexer (IRM) 315 selects between inbound memory request sources. The three sources, in order of priority are: Memory Hazard Requests, Atomic Requests, and Inbound NOC Requests. Cache (Read) 302 and Cache (Write) 385 is an SRAM data cache. The diagram shows the cache as two separate blocks (302 and 385), one providing read access, the other providing write access. Delay Block 325 provides one or more pipeline stages to mimic the delay for an SRAM cache read operation. A cache miss requires access to memory to bring the desired data into the cache. In some examples, and as shown, the memory is DRAM, but in other examples, other types of memory may be used. During this access time, the memory line is not available for other requests. The Memory Hazard block (Set block 330 and Clear block 390) maintains a table of hazard bits indicating which memory lines are unavailable for access. An inbound request that tries to access a line with a hazard is held by the Memory Hazard block until the hazard is cleared. Once the hazard is cleared then the request is resent through the Inbound Request Multiplexer. The memory line tag address is hashed to a hazard bit index. The number of hazard bits may be chosen to set the hazard collision probability to a sufficiently low level. Inbound DRAM Control Multiplexer (IDCM) 335 selects from an inbound NOC request and a cache eviction request. Bank Request Queues 340—each separately managed DRAM bank has a dedicated bank request queue to hold requests until they can be scheduled on the associated DRAM bank.

Scheduler 342 selects across the bank queues 340 to choose a request for an available DRAM bank. The DRAM(s) 345 represents the external DRAM device or devices. Request Hit Data Queue 350 holds request data from cache hits until selected. Request Miss Data Queue 355 holds data read from the DRAM(s) until selected. Miss Request Queue 360 is used to hold request packet information for cache misses until the request is selected. Hit Request Queue 365 holds request packet information for cache hits until selected. Data Selection Multiplexer (DSM) 370 selects between DRAM read data and cache hit read data. The selected data is written to the SRAM cache. Request Selection Multiplexer (RSM) 375 selects between hit and miss request queues 360 and 365.

Atomic/Write Merge 380 either merges the request data and DRAM read data, or, if the request is a built-in atomic, the memory data and request data are used as inputs for an atomic operation. Cache (Write) block 385 represents the write port for the SRAM cache. Data from a NOC write request and data from DRAM read operations are written to the SRAM cache. Memory Hazard (Clear) block 390 represents the hazard clear operation for the memory hazard structure. Clearing a hazard may release a pending NOC request and send it to the Inbound Request Multiplexer. Programmable Atomic Unit 395 processes programmable atomic transactions. NOC Outbound Response Multiplexer (ORM) 397 selects between memory controller responses and custom atomic unit responses and sends the selection to the NOC.

Figure 4:
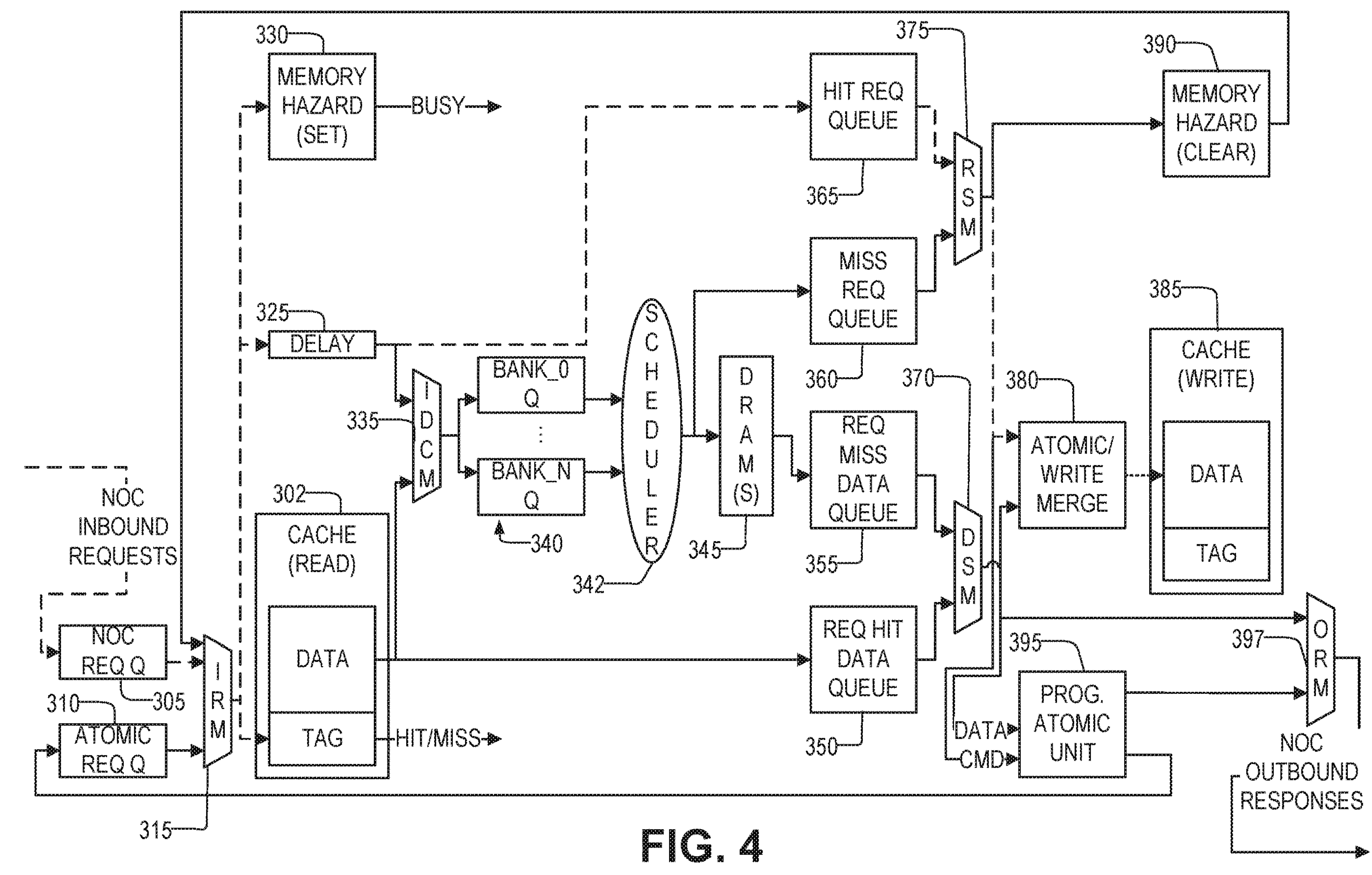
Figure 5:
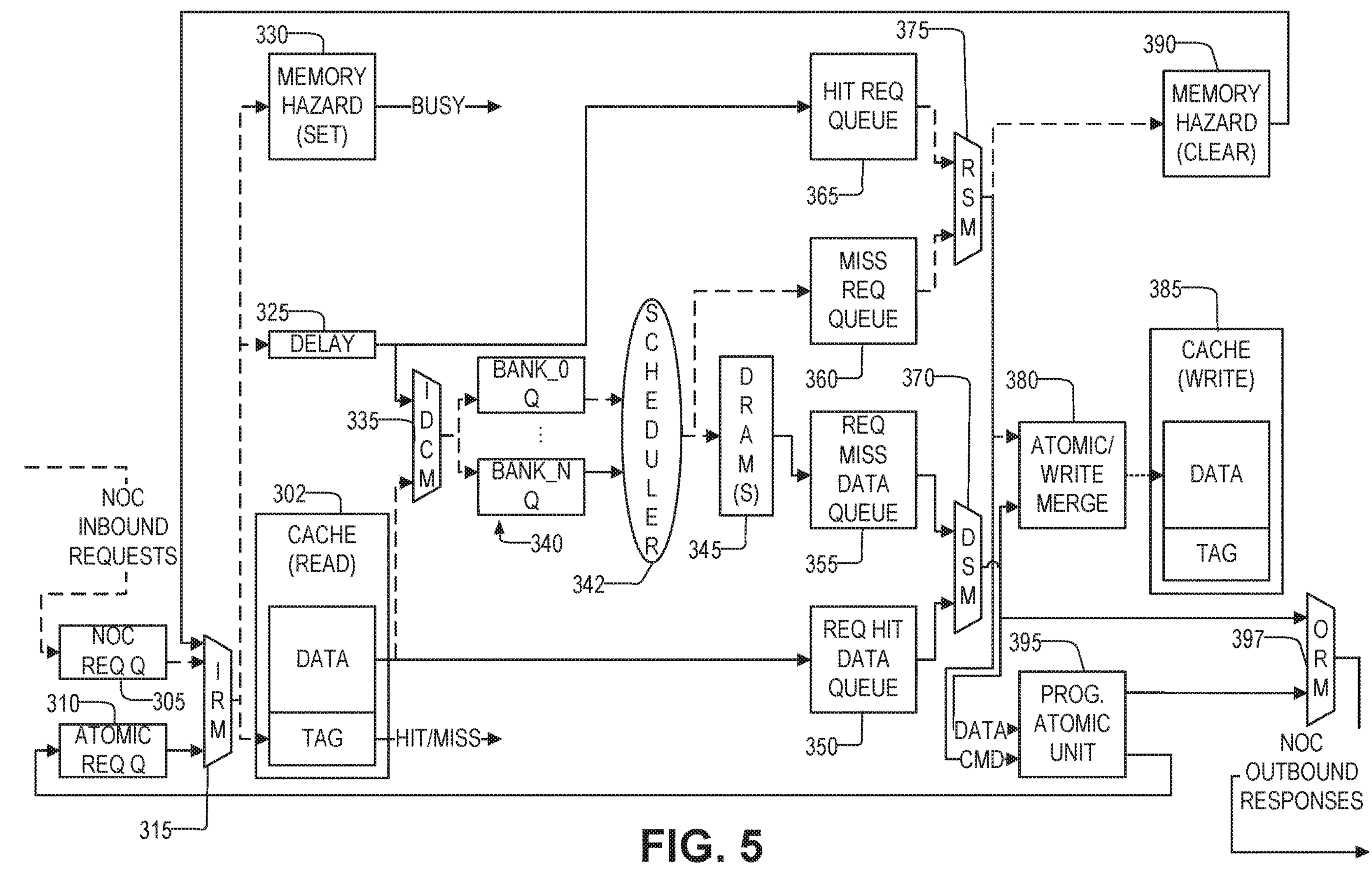

FIG. 4 illustrates the memory controller of FIG. 3 processing a write command. The flow is the same whether the SRAM cache hits or misses for the request and is shown by the dashed line. As an example, a write command received from the NOC may be queued in the NOC request queue 305. The input request multiplexor 315 may select a write request from the NOC request queue 305. The memory hazard may be checked to determine if the memory address is busy. If it is busy, then the write request is delayed waiting for the memory hazard to be cleared. Once the memory hazard is cleared, the write request is processed by the hit request queue 365 and once selected by the request selection multiplexor 375 is written to the cache (write) 385. The cache (read) may determine if the requested address is already in the cache (in which case, the value will be updated). FIG. 5 illustrates the memory controller of FIG. 3 processing a write command with a cache eviction. In FIG. 5, for a write miss, the operation finds a line in the cache to be used for the current write operation. If the contents of the line are dirty (e.g., has unwritten changes) then the line is evicted (written to memory). The line is now transitioned to the address of the new write. At this point, the data is written to the cache as if it were a write hit (since the line's tag now matches the write request's address). The dotted line shows the flow as the evicted item of data is sent to the IDCM 335, banks 340, scheduler 342, and DRAMS 345.

As previously described, minimizing processor wait time is critical to maximizing performance. For example, when a processor issues a write command to the memory controller, the processor waits until the memory controller responds to the write command. By sending the response once the write has been selected by the memory controller input multiplexor (e.g., IRM 315), the processor may continue processing other instructions which minimizes the amount of time that a processor must wait for a memory write request to complete. The memory controller maintains ordering on a per memory line basis from the time a request has been selected until that request is performed at either the memory side cache, or the DRAM memory. The write complete response is returned as soon as the request is selected by the memory controller which guarantees the ordering of prior and subsequent requests to the same address location will be preserved. This is true even if the memory hazard is not clear because these requests are queued in order.

Figure 6:
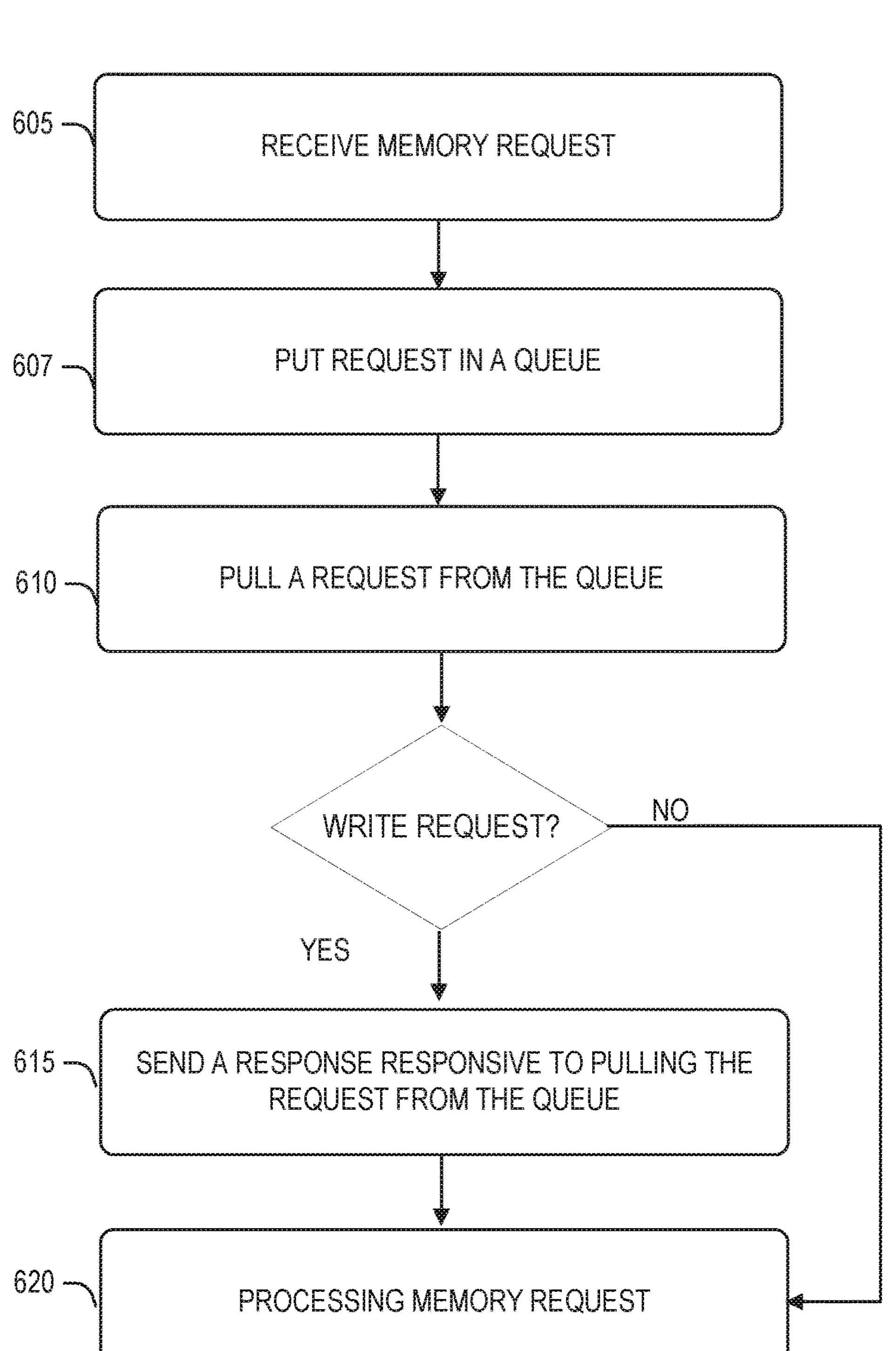
FIG. 6 illustrates a flow chart of a method of handling a memory write request according to some examples of the present disclosure.

FIG. 6 illustrates a flow chart of a method 600 of handling a memory write request according to some examples of the present disclosure. At operation 605, the memory controller may receive a memory request. The request may be a read request, write request, built in atomic transaction request, custom atomic transaction request, or the like. The request may be received from a requesting processor on a same chip as the memory controller, a different chip in a chiplet system (e.g., via an inter-chip network such as CPI), or the like. At operation 607, the controller may put the request in a queue. For example, the network on a chip request queue 305, the atomic request queue 310 if the request is a request for a built-in atomic transaction, or the like.

At operation 610, a request may be pulled from one of the queues. For example, by an input request multiplexor 315. If the request is not a write request, then the flow of FIG. 4 proceeds to operation 620—which is explained later. If the request is a write request, then at operation 615, a response is sent to the processor that sent the request. For example, the response may be sent over an inter-chip network, an on-chip network, or the like. The response is sent before the request is written to memory. For example, the response may be sent prior to, or concurrently with, sending the memory request to the DRAMS 345 or writing the memory request to the cache. Once the response is sent, then at operation 620 the memory request may be serviced, such as setting memory hazard bits, writing to the cache, evicting a value from the cache, and the like.

As previously noted, the ordering of the memory requests may be guaranteed once the write request is selected. That is, previously selected requests finish first, and subsequently selected requests finish after the presently selected request.

Figure 7:
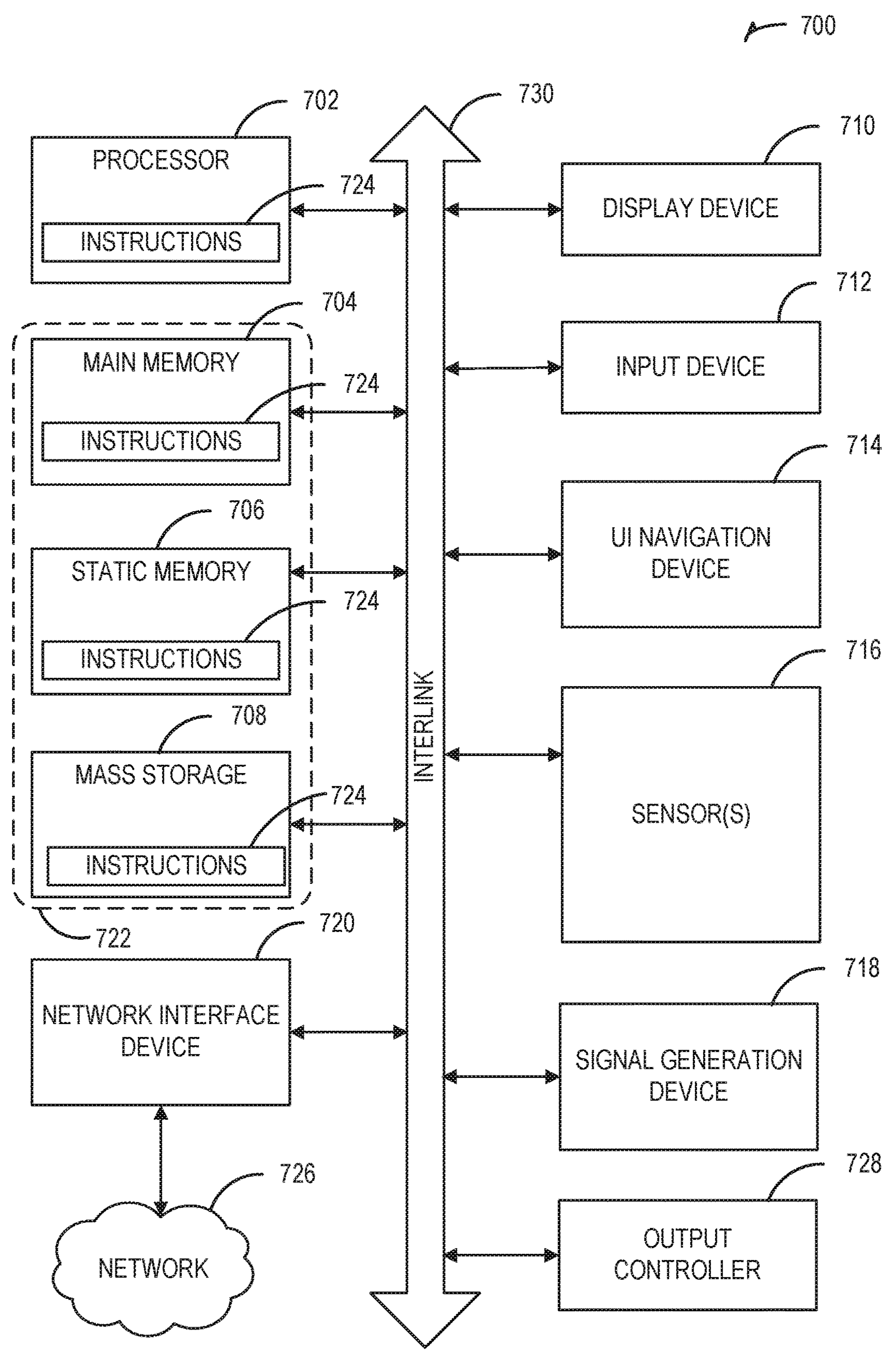
FIG. 7 is a block diagram of an example of a machine with which, in which, or by which embodiments of the present disclosure can operate according to some examples of the present disclosure.

FIG. 7 illustrates a block diagram of an example machine 700 with which, in which, or by which any one or more of the techniques (e.g., methodologies) discussed herein can be implemented. Examples, as described herein, can include, or can operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 can operate as a standalone device or can be connected (e.g., networked) to other machines. In a networked deployment, the machine 700 can operate in the capacity of a server machine, a client machine, or both in server-client network environments. In an example, the machine 700 can act as a peer machine in peer-to-peer (P2P) (or other distributed) network environment. The machine 700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 can include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which can communicate with each other via an interlink (e.g., bus) 730. The machine 700 can further include a display unit 710, an alphanumeric input device 712 (e.g., a keyboard), and a user interface (UI) navigation device 714 (e.g., a mouse). In an example, the display unit 710, input device 712 and UI navigation device 714 can be a touch screen display. The machine 700 can additionally include a mass storage (e.g., drive unit) 708, a signal generation device 718 (e.g., a speaker), a network interface device 720, and one or more sensors 716, such as a global positioning system (GPS) sensor, compass, accelerometer, or other sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 can be, or include, a machine readable medium 722 on which is stored one or more sets of data structures or instructions 724 (e.g., software) embodying or utilized by any one or more of the techniques or functions described herein. The instructions 724 can also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 can constitute the machine readable media 722. While the machine readable medium 722 is illustrated as a single medium, the term "machine readable medium" can include a single medium or multiple media (e.g., a centralized or distributed database, or associated caches and servers) configured to store the one or more instructions 724.

The term "machine readable medium" can include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 can be representative of the instructions 724, such as instructions 724 themselves or a format from which the instructions 724 can be derived. This format from which the instructions 724 can be derived can include source code, encoded instructions (e.g., in compressed or encrypted form), packaged instructions (e.g., split into multiple packages), or the like. The information representative of the instructions 724 in the machine readable medium 722 can be processed by processing circuitry into the instructions to implement any of the operations discussed herein. For example, deriving the instructions 724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 can include assembly, compilation, or interpretation of the information (e.g., by the processing circuitry) to create the instructions 724 from some intermediate or preprocessed format provided by the machine readable medium 722. The information, when provided in multiple parts, can be combined, unpacked, and modified to create the instructions 724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 can be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Other Notes and Examples

Example 1 is an apparatus comprising: a memory array; an input queue coupled to the memory array and configured to receive a memory request from a requesting processor; logic coupled to the input queue and the memory array and configured to: select a memory request from an input queue, the memory request received from a requesting processor; determine that the memory request is a write request to write a request value to a requested location in a memory of the memory array; responsive to a determination that the memory request is a write request: send a response to the requesting processor, the response sent prior to performing the write request; and after sending the response to the requesting processor, performing the write request to write the request value to the requested location in memory.

In Example 2, the subject matter of Example 1 includes, wherein the logic is configured to perform the write request to write a request value to a requested location in memory by being configured to write the request value to a cache.

In Example 3, the subject matter of Examples 1-2 includes, wherein the memory request is received at the input queue from an external interface of the apparatus.

In Example 4, the subject matter of Example 3 includes, wherein the memory request is received over a network on chip interface.

In Example 5, the subject matter of Examples 1-4 includes, wherein the logic is on a first chiplet and the requesting processor is on a second chiplet.

In Example 6, the subject matter of Examples 1-5 includes, wherein the logic is configured to select the memory request from the input queue by being configured to select the memory request from a plurality of input queues using an input multiplexor.

In Example 7, the subject matter of Examples 1-6 includes, wherein the memory array comprises volatile memory on one or more second chiplets in communication with the logic via a memory interface.

In Example 8, the subject matter of Examples 1-7 includes, wherein the logic is configured to enforce an ordering of the write request such that a prior write request to the requested location is completed first and a subsequent write command to the requested location is completed after the write request.

In Example 9, the subject matter of Examples 1-8 includes, wherein the logic is configured to perform the write request to write the request value to the requested location in memory by being configured to write the request value to memory cells of the memory.

In Example 10, the subject matter of Examples 1-9 includes, wherein the logic is configured to perform the write request to write the request value to the requested location in memory by being configured to write the request value to a write cache corresponding to the memory.

Example 11 is a method comprising: selecting a memory request from an input queue, the memory request received from a requesting processor; determining that the memory request is a write request to write a request value to a requested location in a memory; responsive to determining that the memory request is a write request: sending a response to the requesting processor, the response sent prior to performing the write request; and after sending the response to the requesting processor, performing the write request to write the request value to the requested location in memory.

In Example 12, the subject matter of Example 11 includes, wherein performing the write request to write a request value to a requested location in memory comprises writing the request value to a cache.

In Example 13, the subject matter of Examples 11-12 includes, wherein the memory request is received across an external interface of a chiplet system.

In Example 14, the subject matter of Example 13 includes, wherein the memory request is received over a network-on-chip interface.

In Example 15, the subject matter of Examples 11-14 includes, wherein selecting the memory request from the input queue comprises selecting the memory request from a plurality of input queues using an input multiplexor.

In Example 16, the subject matter of Examples 11-15 includes, enforcing an ordering of the write request such that a prior write request to the requested location is completed first and a subsequent write command to the requested location is completed after the write request.

In Example 17, the subject matter of Examples 11-16 includes, wherein performing the write request to write the request value to the requested location in memory comprises writing the request value to memory cells of the memory.

In Example 18, the subject matter of Examples 11-17 includes, wherein performing the write request to write the request value to the requested location in memory comprises writing the request value to a write cache corresponding to the memory.

Example 19 is a non-transitory machine-readable medium, storing instructions, which when executed by a machine, causes the machine to perform operations comprising: selecting a memory request from an input queue, the memory request received from a requesting processor; determining that the memory request is a write request to write a request value to a requested location in a memory; responsive to determining that the memory request is a write request: sending a response to the requesting processor, the response sent prior to performing the write request; and after sending the response to the requesting processor, performing the write request to write the request value to the requested location in memory.

In Example 20, the subject matter of Example 19 includes, wherein the operations of performing the write request to write a request value to a requested location in memory comprises writing the request value to a cache.

In Example 21, the subject matter of Examples 19-20 includes, wherein the memory request is received across an external interface of a chiplet system.

In Example 22, the subject matter of Example 21 includes, wherein the memory request is received over a network on chip interface.

In Example 23, the subject matter of Examples 19-22 includes, wherein the operations of selecting the memory request from the input queue comprises selecting the memory request from a plurality of input queues using an input multiplexor.

In Example 24, the subject matter of Examples 19-23 includes, wherein the operations further comprise enforcing an ordering of the write request such that a prior write request to the requested location is completed first and a subsequent write command to the requested location is completed after the write request.

In Example 25, the subject matter of Examples 19-24 includes, wherein the operations of performing the write request to write the request value to the requested location in memory comprises writing the request value to memory cells of the memory.

In Example 26, the subject matter of Examples 19-25 includes, wherein the operations of performing the write request to write the request value to the requested location in memory comprises writing the request value to a write cache corresponding to the memory.

Example 27 is an apparatus comprising: means for selecting a memory request from an input queue, the memory request received from a requesting processor; means for determining that the memory request is a write request to write a request value to a requested location in a memory; responsive to determining that the memory request is a write request: means for sending a response to the requesting processor, the response sent prior to performing the write request; and after sending the response to the requesting processor, means for performing the write request to write the request value to the requested location in memory.

In Example 28, the subject matter of Example 27 includes, wherein the means for performing the write request to write a request value to a requested location in memory comprises means for writing the request value to a cache.

In Example 29, the subject matter of Examples 27-28 includes, wherein the memory request is received across an external interface of a chiplet system.

In Example 30, the subject matter of Example 29 includes, wherein the memory request is received over a network-on-chip interface.

In Example 31, the subject matter of Examples 27-30 includes, wherein the means for selecting the memory request from the input queue comprises means for selecting the memory request from a plurality of input queues using an input multiplexor.

In Example 32, the subject matter of Examples 27-31 includes, means for enforcing an ordering of the write request such that a prior write request to the requested location is completed first and a subsequent write command to the requested location is completed after the write request.

In Example 33, the subject matter of Examples 27-32 includes, wherein the means for performing the write request to write the request value to the requested location in memory comprises means for writing the request value to memory cells of the memory.

In Example 34, the subject matter of Examples 27-33 includes, wherein the means for performing the write request to write the request value to the requested location in memory comprises means for writing the request value to a write cache corresponding to the memory.

Example 35 is at least one machine-readable medium including instructions that, when executed by processing circuitry, cause the processing circuitry to perform operations to implement of any of Examples 1-34.

Example 36 is an apparatus comprising means to implement of any of Examples 1-34.

Example 37 is a system to implement of any of Examples 1-34.

Example 38 is a method to implement of any of Examples 1-34.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:

a memory controller configured to perform operations comprising:

selecting a memory request from a first input queue using an input multiplexor, the input multiplexor multiplexing between the first input queue and a second input queue, the first input queue storing memory requests from a requesting processor that are received over a network-on-chip interface and the second input queue storing memory requests from an atomic unit of the memory controller;

determining that the memory request is a write request to write a requested value to a requested location in a memory of a memory array;

responsive to determining that the memory request is a write request:

sending a response to the requesting processor over the network-on-chip interface, the response sent prior to performing the write request; and performing the write request to write the request value to the requested location in memory after sending the response to the requesting processor and after all other memory requests that were responded to prior to the memory request have been serviced, but prior to servicing any memory requests responded to after the response has been sent.

2. The apparatus of claim 1, wherein the atomic unit is a programmable atomic unit.

3. The apparatus of claim 1, wherein the operation of performing the write request comprises writing the requested value to a cache.

4. The apparatus of claim 1, wherein the operation of performing the write request to write the request value to the requested location in memory after sending the response to the requesting processor and after all other memory requests that were responded to prior to the memory request have been serviced, but prior to servicing any memory requests responded to after the response has been sent comprises:

performing the write request to write the request value to the requested location in memory after sending the response to the requesting processor and after all other memory requests for a particular memory line corresponding to the requested location that were responded to prior to the memory request have been serviced, but prior to servicing any memory requests for the particular memory line that were responded to after the response has been sent.

5. The apparatus of claim 1, wherein the memory controller is on a first chiplet and the memory request was sent from a requesting processor on a second chiplet.

6. The apparatus of claim 5, wherein the memory request is received over a network-on-chip providing a chiplet network.

7. The apparatus of claim 6, wherein the chiplet network is a packet-based network.

8. A method comprising:

at a memory controller:

selecting a memory request from a first input queue using an input multiplexor, the input multiplexor multiplexing between the first input queue and a second input queue, the first input queue storing memory requests from a requesting processor that are received over a network-on-chip interface and the second input queue storing memory requests from an atomic unit of the memory controller;

determining that the memory request is a write request to write a requested value to a requested location in a memory of a memory array;

responsive to determining that the memory request is a write request:

sending a response to the requesting processor over the network-on-chip interface, the response sent prior to performing the write request; and performing the write request to write the request value to the requested location in memory after sending the response to the requesting processor and after all other memory requests that were responded to prior to the memory request have been serviced, but prior to servicing any memory requests responded to after the response has been sent.

9. The method of claim 8, wherein the atomic unit is a programmable atomic unit.

10. The method of claim 8, wherein performing the write request comprises writing the requested value to a cache.

11. The method of claim 8, wherein performing the write request to write the request value to the requested location in memory after sending the response to the requesting processor and after all other memory requests that were responded to prior to the memory request have been serviced, but prior to servicing any memory requests responded to after the response has been sent comprise:

performing the write request to write the request value to the requested location in memory after sending the response to the requesting processor and after all other memory requests for a particular memory line corresponding to the requested location that were responded to prior to the memory request have been serviced, but prior to servicing any memory requests for the particular memory line that were responded to after the response has been sent.

12. The method of claim 8, wherein the memory controller is on a first chiplet and the memory request was sent from a requesting processor on a second chiplet.

13. The method of claim 12, wherein the memory request is received over a network-on-chip providing a chiplet network.

14. The method of claim 13, wherein the chiplet network is a packet-based network.

15. A non-transitory machine-readable medium, storing instructions, which when executed by a machine, causes the machine to perform operations comprising:

selecting a memory request from a first input queue using an input multiplexor, the input multiplexor multiplexing between the first input queue and a second input queue, the first input queue storing memory requests from a requesting processor that are received over a network-on-chip interface and the second input queue storing memory requests from an atomic unit of the memory controller;

determining that the memory request is a write request to write a requested value to a requested location in a memory of a memory array;

responsive to determining that the memory request is a write request:

sending a response to the requesting processor over the network-on-chip interface, the response sent prior to performing the write request; and performing the write request to write the request value to the requested location in memory after sending the response to the requesting processor and after all other memory requests that were responded to prior to the memory request have been serviced, but prior to servicing any memory requests responded to after the response has been sent.

16. The non-transitory machine-readable medium of claim 15, wherein the atomic unit is a programmable atomic unit.

17. The non-transitory machine-readable medium of claim 15, wherein the operation of performing the write request comprises writing the requested value to a cache.

18. The non-transitory machine-readable medium of claim 15, wherein the operation of performing the write request to write the request value to the requested location in memory after sending the response to the requesting processor and after all other memory requests that were responded to prior to the memory request have been serviced, but prior to servicing any memory requests responded to after the response has been sent comprise:

performing the write request to write the request value to the requested location in memory after sending the response to the requesting processor and after all other memory requests for a particular memory line corresponding to the requested location that were responded to prior to the memory request have been serviced, but prior to servicing any memory requests for the particular memory line that were responded to after the response has been sent.

19. The non-transitory machine-readable medium of claim 15, wherein the memory controller is on a first chiplet and the memory request was sent from a requesting processor on a second chiplet.

20. The non-transitory machine-readable medium of claim 19, wherein the memory request is received over a network-on-chip providing a chiplet network.

* * * * *